United States Patent
Durbin et al.

(10) Patent No.: US 12,437,048 B2
(45) Date of Patent: Oct. 7, 2025

(54) SYSTEMS AND METHODS FOR HEALTHCARE ID

(71) Applicant: Mastercard International Incorporated, Purchase, NY (US)

(72) Inventors: Dan A. Durbin, O'Fallon, MO (US); Shawn J. Mehrhoff, Saint Ann, MO (US); David Vorhies, Saint Charles, MO (US)

(73) Assignee: Mastercard International Incorporated, Purchase, NY (US)

( * ) Notice: Subject to any disclaimer, the term of this patent is extended or adjusted under 35 U.S.C. 154(b) by 226 days.

(21) Appl. No.: 18/458,805

(22) Filed: Aug. 30, 2023

(65) Prior Publication Data
US 2025/0077636 A1    Mar. 6, 2025

(51) Int. Cl.
*G06F 21/32* (2013.01)
*G06F 21/45* (2013.01)
*G06F 21/60* (2013.01)

(52) U.S. Cl.
CPC .............. *G06F 21/32* (2013.01); *G06F 21/45* (2013.01); *G06F 21/602* (2013.01)

(58) Field of Classification Search
CPC .......... G06F 21/32; G06F 21/45; G06F 21/602
See application file for complete search history.

(56) References Cited

U.S. PATENT DOCUMENTS

| | | | |
|---|---|---|---|
| 10,693,872 B1* | 6/2020 | Larson | H04L 9/3231 |
| 11,405,189 B1* | 8/2022 | Bennison | H04L 63/0807 |
| 2022/0076252 A1* | 3/2022 | Prabhu | H04L 63/08 |
| 2022/0138298 A1* | 5/2022 | Law | G06F 21/32 |
| | | | 726/7 |

* cited by examiner

*Primary Examiner* — Hee K Song
(74) *Attorney, Agent, or Firm* — Hovey Williams LLP

(57) ABSTRACT

Techniques are provided for managing a user's digital identity. A method includes providing an option to setup a digital identity on a computing device. The method includes requesting a scan of a physical document that includes personal identifying information of the user. The computing device captures an image of the physical document, and also captures a biometric of the user. The image and the biometric are transmitted to an identity provider for user verification. A digital identity token is received from the identity provider as evidence of the identity of the user. A request to link a financial account of the user to the digital identity token is transmitted to a financial institution of the user. The method includes receiving a billing link identifier from the financial institution. The digital identity token and the billing link identifier are then stored in a personal data store on the computing device.

20 Claims, 7 Drawing Sheets

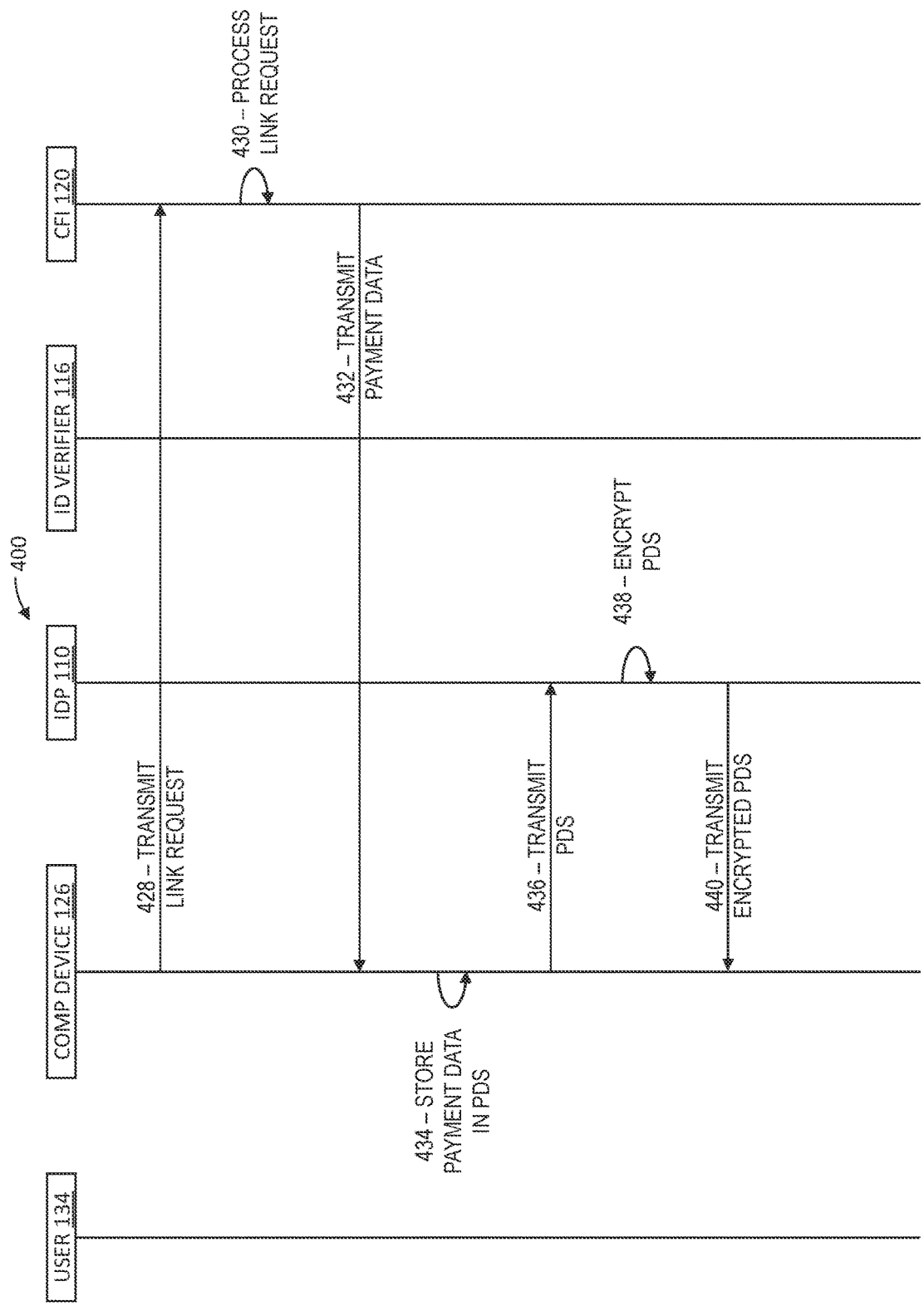

SYSTEMS AND METHODS FOR HEALTHCARE ID

BACKGROUND

The present invention relates generally to digital identities, and in particular, to systems and methods for managing a digital identity that includes features for provisioning billing information to a service provider.

As digital technology continues to revolutionize various industries, the healthcare sector is also witnessing a shift towards digitization and online services. Aspects of the healthcare sector that are lacking include the check-in or registration process for a consumer and the management of medical billing processes. Typically, a consumer must provide one or more documents attesting to his or her identity in addition to medical insurance information. The traditional paper-based system is prone to error and can be a burden for both healthcare providers and consumers. Furthermore, the traditional billing systems are prone to error, lead to security risks, and can also be a burden for both healthcare providers and consumers. In particular, healthcare payments are disjointed and chaotic. A single visit to a healthcare provider may result in multiple bills sent simultaneously to the consumer and the insurance provider, leading to consumers unintentionally or mistakenly making extra payments. This can result in the consumer then attempting to get refunds from potentially multiple healthcare providers.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a system for use in managing a digital identity of a user is provided. The system includes a user computing device associated with the user. The user computing device includes a display, a photographic element, a first memory device, and a first processor in communication with the first memory device. The first processor is configured to provide to the user an option to setup a digital identity on the user computing device. The first processor is also configured to present, on the display, an instruction requesting that the user scan an image of a physical document associated with the user. The physical document includes personal identifying information (PII) of the user. Furthermore, the first processor is configured to capture an image of the physical document by the photographic element, and to capture a biometric of the user. Furthermore, the first processor is configured to transmit the captured image of the physical document and the captured biometric to an identity provider computing device. This permits the identity provider to verify the user based on the captured image of the physical document and the captured biometric. The first processor is also configured to receive, from the identity provider computing device, a digital identity token that functions as evidence of the identity of the user, and to transmit, to a financial institution computing device, a request to link a financial account of the user to the digital identity token. The first processor is further configured to receive, from the financial institution computing device, a billing link identifier, and to store the digital identity token and the billing link identifier in a personal data store in the first memory device.

In another aspect, a computer-implemented method for use in managing a digital identity of a user is provided. The method includes providing to the user, by a user computing device associated with the user, an option to setup a digital identity on the user computing device. The method also includes presenting, on a display of the user computing device, an instruction requesting that the user scan an image of a physical document associated with the user. The physical document includes personal identifying information (PII) of the user. Furthermore, the method includes capturing, by photographic element of the user computing device, an image of the physical document. The method also includes capturing a biometric of the user by the user computing device. Moreover, the method includes transmitting, by the user computing device, the captured image of the physical document and the captured biometric to an identity provider computing device, thereby permitting the identity provider to verify the user based on the captured image of the physical document and the captured biometric. Additionally, the method includes receiving, by the user computing device from the identity provider computing device, a digital identity token that functions as evidence of the identity of the user. The method also includes transmitting, to a financial institution computing device by the user computing device, a request to link a financial account of the user to the digital identity token. Furthermore, the method includes receiving, by the user computing device from the financial institution computing device, a billing link identifier, and storing, in a memory device of the user computing device, the digital identity token and the billing link identifier in a personal data store.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

FIGS. 4A & 4B depict a flowchart illustrating an exemplary computer-implemented method for managing a digital identity that includes features for provisioning billing information to a service provider, according to one aspect of the present invention.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object-oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

Exemplary System

Figure 1:
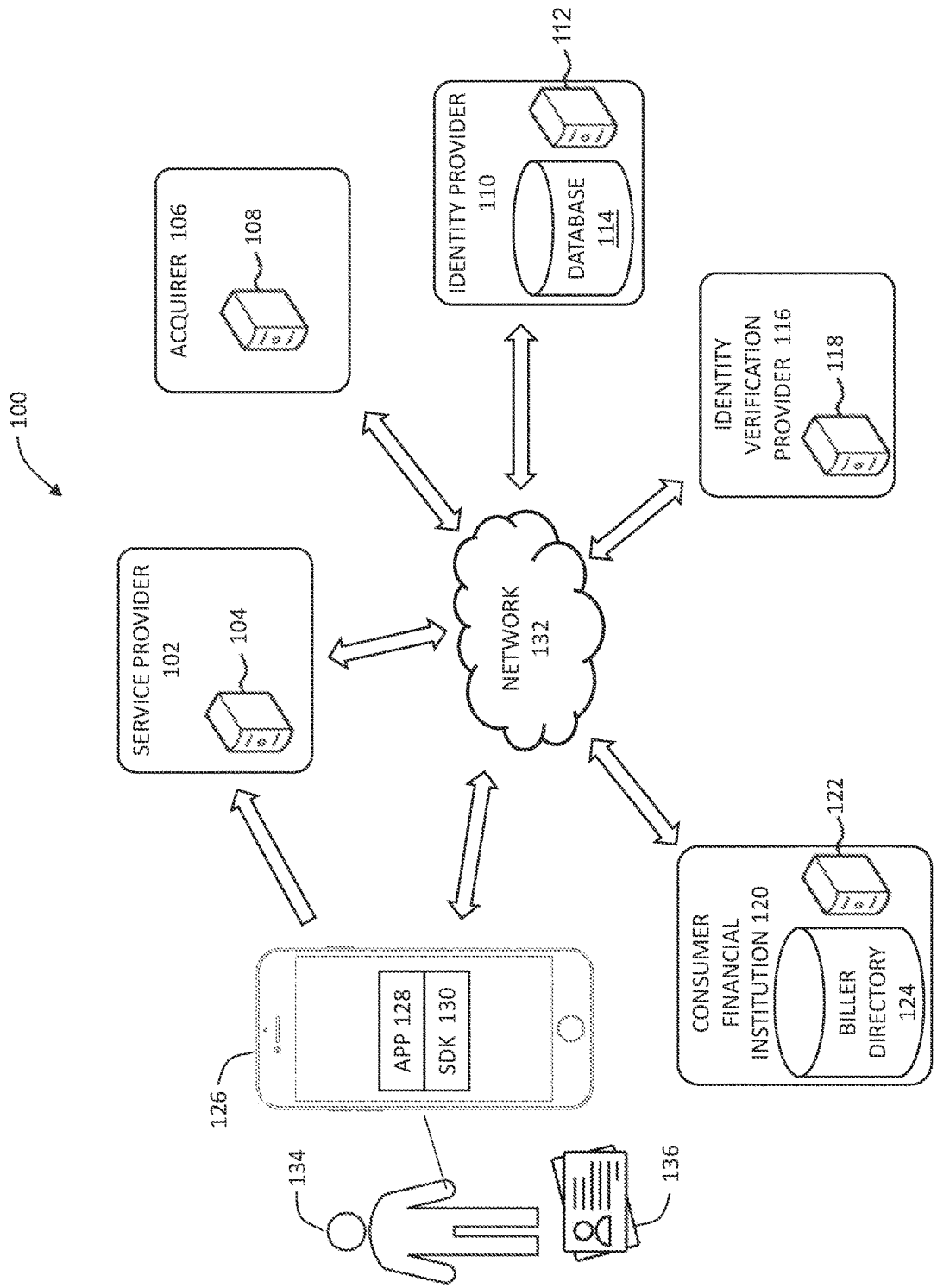
FIG. 1 depicts an exemplary system for utilizing digital identities of users to streamline, aggregate, and simplify user interactions with a service provider and payments.

FIG. 1 depicts an exemplary system 100 for utilizing digital identities of users to streamline, aggregate, and simplify user interactions with a service provider and payments associated with service providers. Although the system 100 is depicted in one arrangement, other embodiments may include the elements of the system 100 (and/or other elements) arranged otherwise depending on, for example, relationships between users and identity providers, particular types of devices utilized with digital identities, relationships between users and service providers, privacy requirements, and the like.

Referring to FIG. 1, the system 100 may generally include a service provider 102 (also referred to as a "relying party"), an acquirer 106 associated with the service provider 102, an identity provider 110, an identity verification provider 116, a consumer financial institution 120, and a user computing device 126. Each of the service provider 102, the acquirer 106, the identity provider 110, the identity verification provider 116, and the consumer financial institution 120 may include, and/or may be implemented in, a computing system, such as computing systems 104, 108, 112, 118, and 122, respectively. Each of the computing systems 104, 108, 112, 118, and 122 may include, for example, a desktop computer, a laptop or tablet computer, an application server, a database server, a file server, or the like, or combinations thereof, configured to execute or run one or more applications and/or provide one or more computing services. In addition, each of the computing systems 104, 108, 112, 118, and 122 may include and/or work in conjunction with application servers, database servers, file servers, gaming servers, mail servers, print servers, or the like, or combinations thereof. Furthermore, each of the computing systems 104, 108, 112, 118, and 122 may include a plurality of servers, virtual servers, or the like, or combinations thereof.

The user computing device 126 and the computing systems 104, 108, 112, 118, and 122 may be coupled to (and in communication with) one or more networks, such as a communication network 132. The communication network 132 may provide wired and/or wireless communication between the user computing device 126 and the computing systems 104, 108, 112, 118, and 122. Each of the user computing device 126 and the computing systems 104, 108, 112, 118, and 122 may be configured to send data to and/or receive data from the communication network 132 using one or more suitable communication protocols, which may be the same communication protocols or different communication protocols as one another.

The communication network 132 may include one or more telecommunication networks, nodes, and/or links used to facilitate data exchanges between one or more devices and may facilitate a connection to the Internet for devices configured to communicate with communication network 132. The communication network 132 may include local area networks, metro area networks, wide area networks, cloud networks, the Internet, cellular networks, plain old telephone service (POTS) networks, and the like, or combinations thereof. The communication network 132 may be wired, wireless, or combinations thereof and may include components such as modems, gateways, switches, routers, hubs, access points, repeaters, towers, and the like.

In the system 100, consumer financial institution 120 (also referred to as an "issuer") may issue a financial account and an associated transaction card (e.g., a credit card, debit, etc.) to the user 134. The user 134 may use the transaction card to tender payment for a purchase from the service provider 102. In an example embodiment, the service provider 102 is typically associated with goods and/or services that are offered for sale and are sold to the user 134. The service provider 102 includes, for example, a physical location and/or a virtual location. A physical location includes, for example, a brick-and-mortar facility, etc., and a virtual location includes, for example, an Internet-based store-front.

To accept payment with the transaction card, the service provider 102 must normally establish an account with a financial institution that is part of the system 100. This financial institution is usually called the "merchant bank," the "acquiring bank," or the acquirer 106. Typically, when the user 134 presents payment for a purchase with, for example, the transaction card, the service provider 102 requests authorization from the acquirer 106 for the amount of the purchase. The request may generally be performed using a point-of-sale (POS) terminal, such as the computing system 104, that reads the user's account information from the transaction card. For example, the computing system 104 may read the account information from embossed characters, a magnetic stripe, or a chip (either via direct contact or wirelessly) on the transaction card, for example, via a card reader (not shown). The computing system 104 may communicate electronically with the computing system 108 of the acquirer 106 to transmit the account information thereto. Alternatively, the acquirer 106 may authorize a third party to perform transaction processing on its behalf. In this case, the computing system 104 will be configured to communicate with the third party. Such a third party is usually called a "merchant processor," an "acquiring processor," or a "third party processor."

The computing system 108 of the acquirer 106 or merchant processor may communicate with the computing device 122 of the issuer 120 to determine whether the user's account is in good standing and whether the purchase is covered by the user's available credit line. Based on these determinations, the request for authorization may be declined or accepted. If the request is accepted, an authorization code may be issued to the service provider 102.

In the example embodiment, the identity provider 110 of the system 100 may generally be associated with providing a digital identity of the user 134 to the service provider 102 in connection with one or more interactions between the user 134 and the service provider 102. As depicted in FIG. 1, the identity provider 110 is shown as a standalone service and/or device of the system 100. It is contemplated, however, that the identity provider 110 may additionally, or alternatively, be incorporated in whole or in part with another party of the system 100, such as, for example, a payment network or a banking institution, etc. Specifically, for example, the identity provider 110 may be incorporated into the Mastercard® payment network and configured to operate as described herein to provide corresponding services to users via and/or in association with the Mastercard payment network. (Mastercard is a registered trademark of Mastercard International Incorporated). The Mastercard payment network is a set of proprietary communications standards promulgated by Mastercard International Incorporated for the exchange of financial transaction data and the settlement of funds between financial institutions that are members of Mastercard International Incorporated.

The identity provider 110 may be configured to interact with the user 134 to receive evidence of the identity of the user 134 to compile a digital identity for the user 134. The identity provider 110 may be configured to compile the digital identity for the user 134 after such evidence is received and after the user's identity is verified. The identity provider 110 may be configured to store the digital identity in a database, such as the database 114 associated with the identity provider 110. As such, the database 114 may include the user's digital identity and other digital identities for other users, and corresponding certification records therefor (together or separately). In some embodiments, the digital identities and the corresponding certification records may be stored in a block chain data structure, whereby the data structure may include a continually growing list of ordered records (where each record includes a time stamp and a reference or link to a prior record). Alternatively, the digital identities and the corresponding certification records may be stored in any other data structure or system, equivalent or not, that enable the system 100 to function as described herein.

The identity provider 110 may be further configured to provision the compiled digital identity for the user 134 to one or more computing devices, such as, for example, the user computing device 126. The digital identity may be provided, by the user 134 (via the user computing device 126, etc.), to one or more relying parties, such as the service provider 102, when requested and/or in connection with transactions between the user 134 and the service provider 102. In this manner, the service provider 102 may be able to and may rely on the digital identity of the user 134 to satisfy, for example, proof of identity and/or know your customer (KYC) requirements, etc.

The identity verification provider 116 in the system 100 may include an entity that knows the identity of the user 134 (and other users), for example, based on records associated with the user 134. For example, the identity verification provider 116 may include a government entity, such as a state department of motor vehicles (DMV), or a customs and border protection agency, either of which may possess a record(s) associated with the user 134. The record(s) associated with the user 134 may include a biometric associated with the user 134. For example, a DMV may have a record, identifiable by a driver's license number, which may include a facial image of each user with a driver's license issued by the DMV. It is contemplated that other entities, including, for example, financial institutions, utility providers, medical services entities, telecommunication providers, etc. (and more generally, any entity in possession of a biometric that may be verified to a particular user) may also be identity verification providers in embodiments of the system 100, with each potentially including different attributes of a user's identity.

As discussed above, the consumer financial institution 120 may be an issuer of a payment account of the user 134 and/or may provide access to the payment account on behalf of an issuer of the account. The consumer financial institution 120 may also provide a bill payment environment through which the user 134 may pay one or more bills (and/or conduct other financial processes, such as viewing balances, performing transfers, and the like). The bill payment environment may include, for example, a web site or software application maintained by the consumer financial institution 120, such as a mobile application 128 operable on the user computing device 126. As described herein, the user 134 may have the user computing device 126 associated therewith. The user computing device 126 may include any device capable of accessing the Internet, as well as the bill payment environment of consumer financial institution 120.

The consumer financial institution 120 includes or has access to a biller directory 124. The biller directory 124 may store records associated with a plurality of billers, such as the service provider 102. The biller records may include biller information, including biller identifiers (IDs) and associated acquirer IDs and/or billing service provider IDs. The biller records also may include, for example, a biller name, a biller class code/description, currency, biller preferences, effective/live date of any biller preferences or record changes/updates, estimated posting hours, biller logo, biller terms and conditions, and biller messaging details (e.g., service type, connectivity type). The biller records may be updated periodically and/or in response to a biller transmitting new or updated biller information or biller preferences. The biller records may be stored in the biller directory 124 and may be collectively referred to as a "directory file."

In an example embodiment, on a regular, periodic basis (e.g., every day, every other day, every week, etc.), the consumer financial institution 120 may access the biller directory 124 to retrieve the directory file. In one or more alternative embodiments, the consumer financial institution 120 may only access the biller directory 124 to retrieve the directory file when the directory file has been updated. The consumer financial institution 120 may retrieve the directory file and may store at least a portion of the data therein. In particular, the consumer financial institution 120 may store biller IDs, BSP IDs, and biller preferences, for example. Accordingly, when a user 134 initiates a bill payment transaction and/or the service provider submits a bill, the consumer financial institution 120 retrieves biller information and preferences associated with the service provider 102 to determine what payment options to present to the user 134.

In the exemplary embodiment, the user computing device 126 and the computing systems 104, 108, 112, 118, and 122 may connect to the communication network 132 either through wires, such as electrical cables or fiber optic cables, or wirelessly, such as radio frequency (RF) communication using wireless standards such as cellular 3G, 4G, 5G, and the like, Institute of Electrical and Electronics Engineers (IEEE) 802.11 standards such as WiFi, IEEE 802.16 standards such as WiMAX, Bluetooth™, or combinations thereof. In aspects in which the communication network 132 facilitates a connection to the Internet, data communications may take place over the communication network 132 via one or more suitable Internet communication protocols. For example, the communication network 132 may be implemented as a wireless telephony network (e.g., GSM, CDMA, LTE, etc.), a Wi-Fi network (e.g., via one or more IEEE 802.11 Standards), a WiMAX network, a Bluetooth network, etc.

In an embodiment, the user computing device 126 may be a mobile computing device, including a camera and a web browser. It is contemplated, however, that the user computing device 126 may be any device, such as a mobile phone, Smartphone, personal digital assistant (PDA), key fob, and/or a computer, such that one or more of the computing systems 104, 108, 112, 118, and 122 are accessible to the user computing device 126 using, for example, the Internet. The user computing device 126 may be interconnected to the Internet through one or more of many interface types including, for example, a network, such as a wireless network adapter or a wireless data transceiver for use with Bluetooth communication, radio frequency communication, near field communication (NFC), and/or with a mobile phone network, Global System for Mobile communications (GSM), 3G, 4G, 5G, or other mobile data network, and/or Worldwide Interoperability for Microwave Access (WiMax) and the like. The user computing device 126 may be any device capable of interconnecting to the Internet including an Internet connected phone, or any other suitable web-based connectable equipment.

The computing device 126 may generally be associated with the user 134 and includes a mobile application 128. The mobile application 128 may be configured (via executable instructions) to interact with the identity provider 110 in connection with requesting, providing, updating, etc. a digital identity of the user 134. Specifically, in the exemplary embodiment, the mobile application 128 includes a software development kit (SDK) 130 associated with the identity provider 110. The SDK 130 may configure the computing device 126 to interact with the identity provider 110. Furthermore, as described herein, the computing device 126 is associated with the user 134 who, in turn, is associated with an identity. The identity of the user 134 may be evidenced by one or more physical documents, such as the physical document 136. The physical document 136 may include, for example, a government issued license (e.g., issued by a state, regional, or federal government). It is contemplated, however, that the physical document 136 may include additional and/or other physical documents for the user 134, such as, for example, a health insurance card, a passport, a government issued identification document, a social security card, a bank statement, an employee ID, a library card, a utility bill, etc. The physical document 136 (and any other physical documents) includes one or more attributes of the user 134 and/or of the identity of the user 134. The one or more attributes distinguishes the user 134, alone or in combination, from one or more other users (not shown). The attributes may include, for example and without limitation, a name of the user 134, a mailing address, a birthdate, contact information (e.g., a phone number, an email address, etc.), a social security number or other government identification number, and/or any other desired attribute of the user 134.

Exemplary Computer Systems

Figure 2:
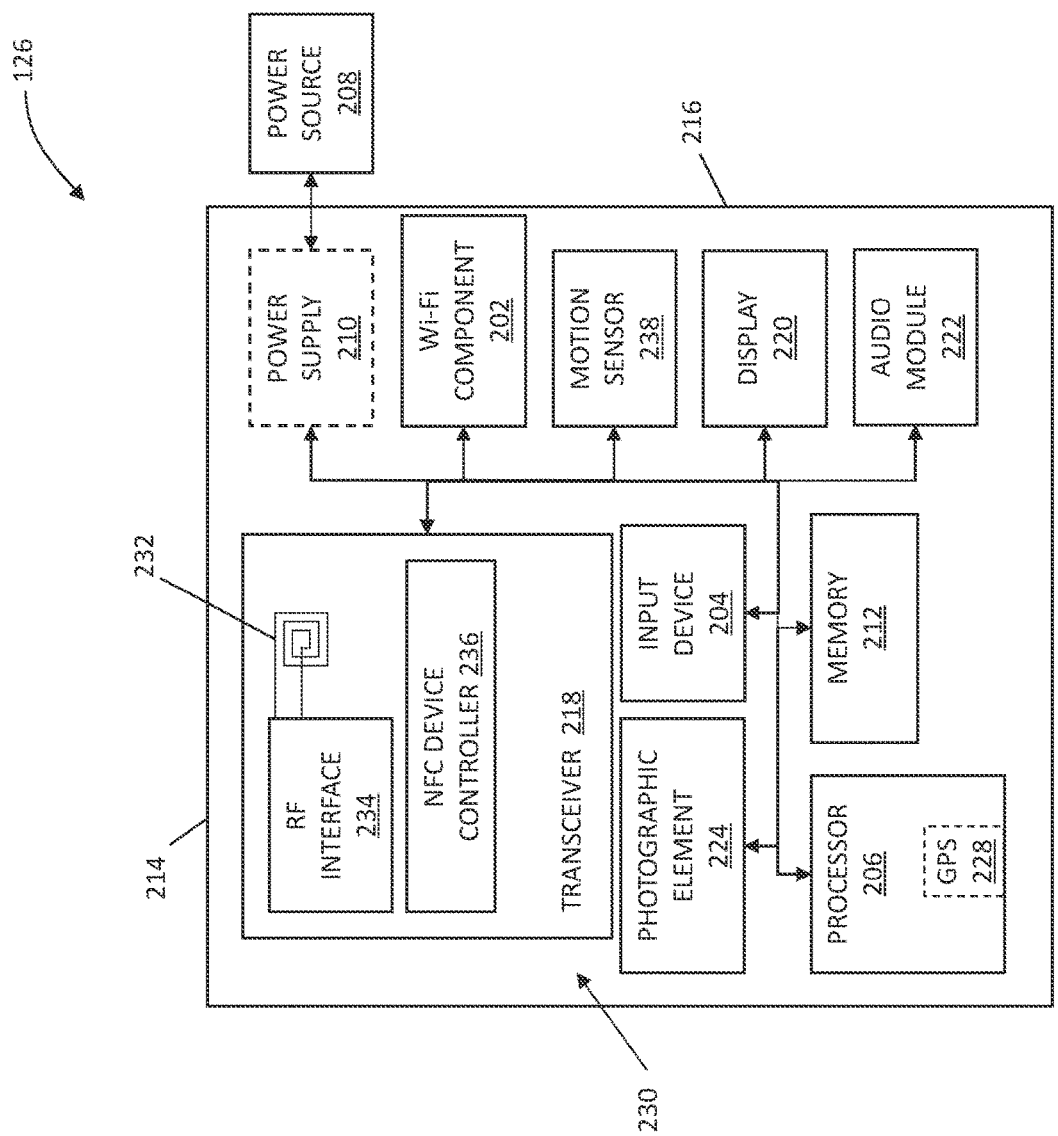
FIG. 2 is an example configuration of a user computing system of the system of FIG. 1.

FIG. 2 is an example configuration of a user computing system 200, such as the user computing device 126 (shown in FIG. 1) that may be operated by a user, such as the user 134 (shown in FIG. 1). In the exemplary embodiment, the computing system 200 may be a computing device configured to connect wirelessly to one or more of the service provider 102, the identity provider 110, the consumer financial institution 120, the network 132, and any other computing devices.

In the exemplary embodiment, the computing system 200 may generally include a processor 206, a memory device 212, a transceiver 218 (or a wireless communication device), and a photographic element 224. In addition, the computing system 200 may include an integrated Wi-Fi component 202 (e.g., implementing the Institute of Electrical and Electronics/IEEE 802.11 family of standards), an input device 204, a display 220, and an audio module 222. Moreover, the computing system 200 optionally may include an internal power supply 210 (e.g., a battery or other self-contained power source) to receive power, or alternatively, in some embodiments, the computing system 200 may include an external power source 208. Optionally, the computing system 200 may include a motion sensor 238.

The processor 206 may include one or more processing units (e.g., in a multi-core configuration) specially programmed for executing computer readable instructions. The instructions may be executed within a variety of different operating systems (OS) on the computing system 200, such as UNIX, LINUX, Microsoft Windows®, etc. More specifically, the instructions may cause various data manipulations on data stored in the memory device 212 (e.g., create, read, write, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). The memory device 212 may be any device allowing information such as transaction card data, the executable instructions, and/or other data to be stored and retrieved. The memory device 212 may include one or more computer readable media.

In the example embodiment, the processor 206 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 200 may be widely deployed, it may be impractical to manually update software for each computing system 200. Therefore, the system 100 may provide a mechanism for automatically updating the software on the computing system 200. For example, an updating mechanism may be used to automatically update any number of components and their drivers, both network and non-network components, including system level (OS) software components. In some embodiments, the components of the computing system 200 may be dynamically loadable and unloadable; thus, they may be replaced in operation without having to reboot the OS.

A location of the computing system 200 may be obtained through conventional methods, such as a location service (e.g., global positioning system (GPS) service) in the computing system 200, "ping" data that includes geotemporal data, from cell location register information held by a telecommunications provider to which the computing system 200 may be connected, and the like. For example, in one suitable embodiment, an optional GPS chip 228 may be part of or separate from the processor 206 to enable the location of the computing system 200 to be determined.

The Wi-Fi component 202 (broadly, a communication interface) may be communicatively connectable to a remote device such as the POS terminal 34, the network 20, and/or the server system 40. The Wi-Fi component 202 may include, for example, a wireless or wired network adapter or a wireless data transceiver for use with Wi-Fi (e.g., implementing the Institute of Electrical and Electronics/IEEE 802.11 family of standards), Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 212 may be, for example, computer readable instructions for providing a user interface to the user, such as the user 134, via the display 220 and, optionally, receiving and processing input from the input device 204. A user interface may include, among other possibilities, a web browser and a client application, such as the application 128 (shown in FIG. 1), which may be hosted by the identity provider 110. Web browsers may enable users, such as the user 134, to view and interact with media and other information typically embedded on a web page or a website. A client application, such as the application 128, may allow the user 134 to interact with a server application, for example, associated with the identity provider 110.

The photographic element 224 may include a camera or other optical sensor and lens combination capable of generating a video signal and capturing an image, iris scan, and the like. In various embodiments, the photographic element 224 may be integrated in a housing or body, such as a housing 214, of the computing system 200. When the photographic element 224 captures an image or otherwise generates image data (e.g., video data), the photographic element 224 may store the image data in a data file, either in a raw or compressed format, in the memory device 212.

In some embodiments, the motion sensor 238 may include one or more sensor elements that facilitate detecting a person's presence. For example, the motion sensor 238 may detect when the user 134 moves or raises the user consumer system 200. Upon detection of such motion, the photographic element 224 may begin capturing images (e.g., still or video images), the transceiver 218 may be activated, and/or the audio module 222 may begin capturing audio. The motion sensor 238 may be operatively coupled to the photographic element 224 such that the consumer's presence may be detected by detecting motion using the photographic element 224. The motion sensor 238 may include, for example, and without limitation, sensor elements such as a passive infrared sensor, an ambient light sensor, and the like.

In the example embodiment, the display 220 may include, for example, and without limitation, a liquid crystal display (LCD), an organic light emitting diode (OLED) display, or an "electronic ink" display. In some embodiments, a single component such as a touch screen may function as both an output device (e.g., the display 220) and the input device 204. As such, the display 220 may optionally include a touch controller for support of touch capability. In such embodiments, the computing system 200 may detect the presence of the user 134 by detecting that the user 134 has touched the display 220 of the computing system 200.

The audio module 222 may include, for example, and without limitation, a speaker and related components capable of broadcasting streaming and/or recorded audio and may also include a microphone. The microphone facilitates capturing audio through the computing system 200.

In the example embodiment, the computing system 200 includes the housing 214 at least partly (and more preferably, at least substantially or entirely) enclosing the components described above. In addition, the computing system 200 includes circuitry 230 configured to communicate with the network 132 (shown in FIG. 1) and/or other computing devices (e.g., other mobile devices, the computing systems 104, 108, 112, 118, and 122, etc.). The circuitry 230 may include, for example, leads, connectors, NFC-enabled circuitry, Wi-Fi-enabled circuitry, and photographic element circuitry. The housing 214 is preferably configured to seal the circuitry 230, which is susceptible to degradation from the ambient environment. In one embodiment, the circuitry 230 is hermetically sealed in the housing 214. For example, in one embodiment, the circuitry 230 is completely and permanently encased within the housing 214. In other words, the housing 214 and the circuitry 230 are intended to remain as a single, inseparable unit throughout the life of the computing system 200. It is understood that the housing 214 can be formed separately from the circuitry 230 and that the circuitry 230 can be placed into and sealed within the housing 214 in a separate operation. It is also understood that the housing 214 can be oversized with respect to the circuitry 230 so that the circuitry 230 can be placed loosely into the housing 214. In another embodiment, the circuitry 230 can be selectively, sealingly enclosed within the housing 214, where the housing 214 includes a closure 216 removably attached to a body of the housing 214.

The housing 214 may be fabricated from a suitably selected material that facilitates inhibiting the effect the material has on the signal being emitted from, for example, the transceiver 218 and/or the Wi-Fi component 202 and passing through the housing material. For example, and without limitation, suitable materials from which the housing 214 may be fabricated include polyethylene, propylene, isoprene, and butylenes (i.e., polyolefins). In other embodiments, the housing 214 may be fabricated from any material that enables the computing system 200 to function as described herein, such as metals, etc.

In one embodiment, the transceiver 218 may include an antenna 232. The antenna 232 includes a looped wire configured to transmit radio signals when current flows through the looped wire. The antenna 232 is any size, shape, and configuration that is suitable for transmitting signals as described herein. For example, the antenna 232 may be a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 232 generates a magnetic field when it vibrates at a selected frequency. Specifically, the antenna 232 may be configured to vibrate at a frequency of about 13.56 MHz, which is suitable for use in a near field communication (NFC) system.

In the example embodiment, the antenna 232 may transmit radio signals to and may receive radio signals from other wireless-enabled computing devices, for example, another mobile device, the computing systems 104, 108, 112, 118, and 122, and/or any other components used in wireless systems. In NFC systems, for example, at least one NFC component generates a magnetic field to inductively transfer currents and, thereby, exchange signals and information with other NFC components positioned within the magnetic field. In one example embodiment, the antenna 232 may function as an NFC component to send and receive signals. The antenna 232 may be configured to transmit radio signals to NFC components positioned within the magnetic field of the antenna 232, such as when the computing system 200 is positioned within a predetermined distance of the computing system 104. Therefore, the magnetic field generated by the antenna 232 may define the active range of the computing system 200. Additionally, the antenna 232 may receive radio signals from NFC components when the antenna 232 is positioned within the magnetic field of the NFC components.

The transceiver 218 also may include a radio frequency (RF) interface 234 and an NFC device controller 236. The RF interface 234 and the NFC device controller 236 may be powered by the power source 208, and in some embodiments, the internal power supply 210 and/or the display 220. In addition, the processor 206 and the memory device 212 may be powered in the same manner. The RF interface 234 may be configured to receive and transmit RF signals through the antenna 232. The NFC device controller 236 may be configured to process the received RF signals and to generate signals to be transmitted by the RF interface 234. The memory device 212 may be configured to store data associated with transmitting and receiving the RF signals. The NFC device controller 236 may be coupled in communication with the processor 206.

In some embodiments, the computing system 200 may be connected to one or more peripheral devices (not shown). That is, the computing system 200 may communicate various data with one or more peripheral devices. For example, the computing system 200 may communicate with one or more peripheral devices through the Wi-Fi component 202, the transceiver 218, or other suitable means.

Figure 3:
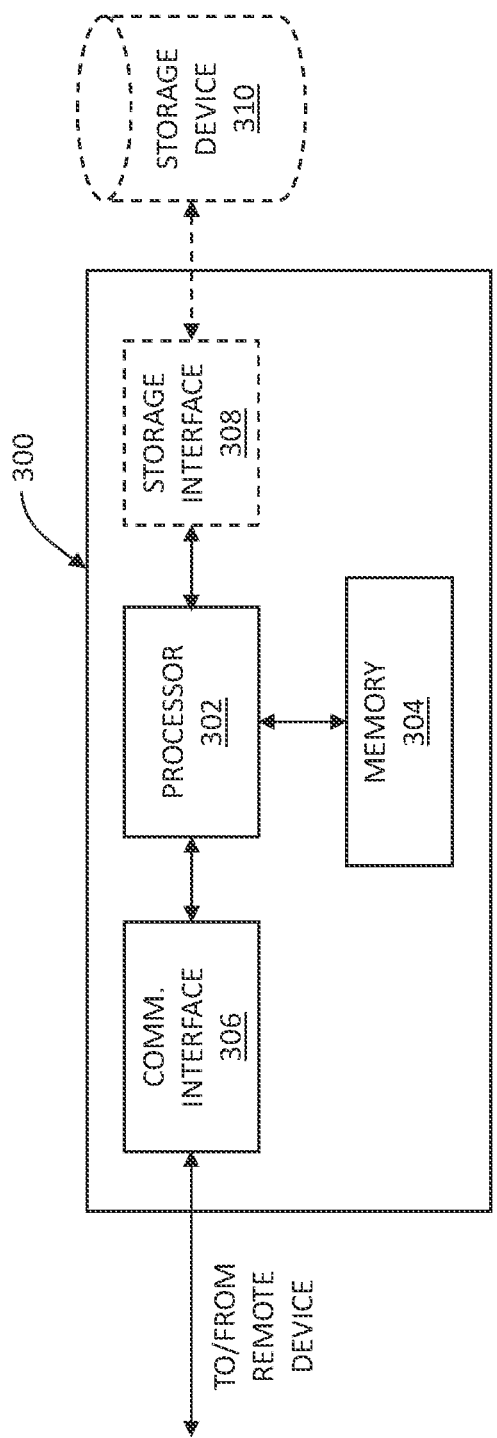
FIG. 3 is an example configuration of a server system of the system of FIG. 1.

FIG. 3 is an example configuration of a server system 300. In an embodiment, the server system 300 may include, but not be limited to, the computing systems 104, 108, 112, 118, and 122 (shown in FIG. 1). In the example embodiment, the server system 300 may include a processor 302 for executing instructions. The instructions may be stored in a memory 304, for example. The processor 302 may include one or more processing units (e.g., in a multi-core configuration) for executing the instructions. The instructions may be executed within a variety of different operating systems on the server system 300, such as UNIX, LINUX, Microsoft Windows®, etc. More specifically, the instructions may cause various data manipulations on data stored in a storage device 310 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

The processor 302 may be operatively coupled to a communication interface 306 such that the server system 300 can communicate with a remote device such as a user computing system 200 (shown in FIG. 2), one or more of the computing systems 104, 108, 112, 118, and 122, and/or another server system. For example, the communication interface 306 may receive communications from a user computing device 126 via the Internet (FIG. 1).

The processor 302 may be operatively coupled to the storage device 310. The storage device 310 may be any computer-operated hardware suitable for storing and/or retrieving data. In some embodiments, the storage device 310 may be integrated in the server system 300. In other embodiments, the storage device 310 may be external to the server system 300. The storage device may be similar to the databases 114 and 124 (shown in FIG. 1). For example, the server system 300 may include one or more hard disk drives as the storage device 310. In other embodiments, the storage device 310 may be external to the server system 300 and may be accessed by a plurality of server systems. For example, the storage device 310 may include multiple storage units such as hard disks or solid-state disks in a redundant array of inexpensive disks (RAID) configuration. The storage device 310 may include a storage area network (SAN) and/or a network attached storage (NAS) system.

In some embodiments, the processor 302 may be operatively coupled to the storage device 310 via a storage interface 308. The storage interface 308 may be any component capable of providing the processor 302 with access to the storage device 310. The storage interface 308 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 302 with access to the storage device 310.

The memory 304 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Computer-Implemented Methods

Figure 4A:
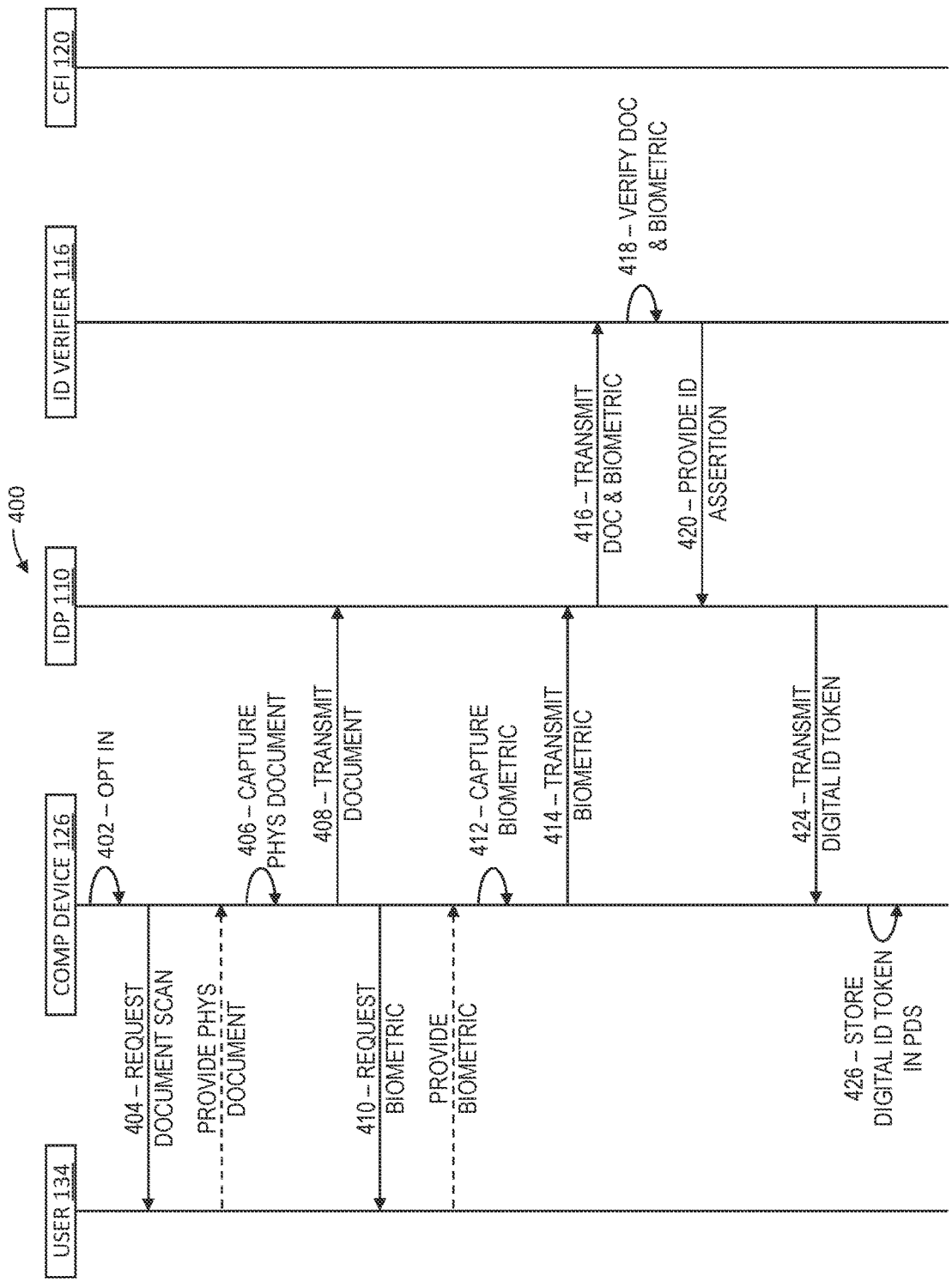

FIGS. 4A & 4B depict a flowchart illustrating an exemplary computer-implemented method 400 for managing a digital identity that includes features for provisioning billing information to a service provider, such as the service provider 102 (shown in FIG. 1), according to one aspect of the present invention. The operations described herein may be performed in the order shown in FIGS. 4A & 4B or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 400 is described below, for ease of reference, as being executed by exemplary devices and components introduced with the embodiments illustrated in FIGS. 1-3. In one embodiment, the computer-implemented method 400 is implemented by the identity provider 110 (shown in FIG. 1). While operations within the computer-implemented method 400 are described below regarding the identity provider 110, according to some aspects of the present invention, the computer-implemented method 400 may be implemented using any other computing devices and/or systems of the system 100 through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In the exemplary embodiment, the user 134 may opt into the provisioning of a digital identity by the identity provider 110, at operation 402. For example, the user may select an option to setup a digital identity on the user computing device 126. A digital identity includes personal identifying information (PII) of the user 134, which may be used by the service provider 102 to positively identify the user 134 and establish a billing arrangement therewith. When the user 134 opts into the provisioning of the digital identity, at operation 404, the user computing device 126 may be configured, by the application 128 via the SDK 130, to instruct the user 134 to scan an image of a physical document associated with the user 134 that includes PII, such as the physical document 136 (e.g., the user's driver's license, medical insurance card, a passport, or other document containing PII). The instruction may include a textual presentation on the display 220 of the user computing device 126. For example, and without limitation, regarding the PII provided by the physical document 136, the user 134 may provide a document that includes a name, a mailing address (e.g., a street, a city, a state and ZIP code, etc.), a home phone number, a work phone number, a cell phone number, an email address, government ID numbers (e.g., a driver's license number, a social security number, a passport number, etc.), a gender, a birthplace, a date of birth, a payment account credential, etc. (all, broadly, PII). It should be appreciated that additional PII may be requested by the identity provider 110 (the application interface 128 or SDK 130) from the user 134 in other embodiments (e.g., during registration, after initial registration, etc.).

In response to one or more inputs from the user 134, at operation 406, the user computing device 126 may be configured, by the application 128 via the SDK 130, to capture an image of the physical document 136. Apart from the capture of the image, for example via the photographic element 224 of the user computing device 126 (shown in FIG. 2), it is contemplated that the user computing device 126 may be configured to otherwise interact with the physical document 136 (depending on the particular type of the physical document 136), such as, for example, through an NFC interaction with a security chip of the document 136 (e.g., such as a security chip of a passport document, etc.), whereby an image may then be generated for the document 136.

At operation 408, the user computing device 126 may be configured, by the application 128 via the SDK 130, to securely transmit the captured image(s) of the physical document 136 to the identity provider 110 associated with providing the digital identity to the user 134. It should be appreciated that the application 128 may include, for example, identifying information associated with the identity provider 110 (e.g., email address, API, etc.) to enable the captured image(s) to be transmitted to the identity provider 110, for example, via the SDK 130.

At operation 410, the user computing device 126 may be configured, by the application 128 via the SDK 130, to instruct the user 134 to provide an image of the user 134 (e.g., a facial image, a selfie, etc.) or other biometric of the user 134 (e.g., an iris scan, a fingerprint, a palm print, etc.). The instruction may include a textual presentation on the display 220 of the user computing device 126. The user 134 may provide his or her biometric to the user computing device 126.

At operation 412, the user computing device 126 may be configured, by the application 128 via the SDK 130, to capture the biometric of the user 134, such as an image of the user 134 (e.g., a facial image, a selfie, etc.) or other biometric of the user 134 and store the same as a template (e.g., a biometric template, etc.). At operation 414, the user computing device 126 may be configured, by the application 128 via the SDK 130, to securely transmit the captured image(s) and/or biometric template(s) to the identity provider 110. For example, a facial image may be captured from the user 134 (e.g., subject to liveness detection, etc.), and then compared to the facial image included in an image of the physical document 136 captured by the user computing device 126.

At operation 416, the identity provider 110 may be configured to pass the image(s) (e.g., images(s) of the physical document 136 and facial image of the user 134) and/or the biometric template(s) of the user 134 to the identity verification provider 116, for example, associated with the document 136. It is contemplated that different identity verification providers may be associated with different documents provided by the user 134 and, depending thereon, may also or alternatively be contacted by the identity provider 110.

In response, at operation 418, the identity verification provider 116 may be configured to verify the identity of the user 134 and to also verify the biometric (e.g., the facial image, iris scan, fingerprint, palm print, etc. of the user 134) provided by the user computing device 126. In particular, where the identity verification provider 116 is a DMV, the identity verification provider 116 may be configured to verify the image of the physical document 136 (i.e., the driver's license) against its records for the driver's license and/or to verify the facial image (e.g., a selfie, etc.) of the user 134 (or the biometric template therefor) against an image of the user 134 previously captured by the DMV, for example, when the driver's license was issued. It is contemplated that the same or similar identity verifications, by the identity verification provider(s) 116, may be completed on other types of physical documents 136 and/or biometrics received from the user computing device 126. After the user 134 is verified, the identity verification provider 116 may be configured to provide an assertion for the image(s) and the user 134 back to the identity provider 110 at operation 420.

At operation 422, the identity provider 110 may be configured to compile a digital identity (or digital ID) token for the user 134, which securely binds data therein, and may store the digital ID token (or a version thereof) in memory (e.g., the memory 304, etc.) in the identity provider 110 (e.g., the database 114). In this exemplary embodiment, the digital ID token may function as evidence of the identity of the user 134 and may include and/or bind the name of the user 134, contact information for the user 134, a device ID for the user computing device 126 (generally linking the user computing device 126 to the ID token, for example, when the user 134 subsequently requests use of the ID token, etc.), the image of the physical document 136 (or template thereof), one or more attributes of the user's identity, and/or the captured biometric of the user 134 (as a biometric template), etc. It should be appreciated that in some embodiments, other suitable and/or desirable data may be included and/or bound within the digital ID token. Further, in certain embodiments, the identity provider 110 may be configured to optionally sign the digital ID token (e.g., with a key). At operation 424, the identity provider 110 may be configured to transmit the digital ID token to the user computing device 126.

In the example embodiment, upon receipt of the digital ID token, at operation 426, the user computing device 126 may be configured to store the digital ID token in a personal data store (PDS). The PDS may be stored in memory (e.g., the memory 212), such as in a trusted execution environment (TEE) therein, whereby the digital ID token (i.e., the user's digital identity) is provisioned to the user computing device 126.

At operation 428, the user 134 may access the consumer financial institution 120, for example, via the application 128, and transmit a request to link the user's financial account and/or account information to the user's digital identity, such as the digital ID token. For example, the user 134 may provide his or her payment preferences, such as a preferred default payment option (e.g., transaction card vs. bank account, a first transaction card vs. a second transaction card, etc.), for payment for a bill(s) from the service provider 102. The request to link may include security answers to security questions, user credentials for accessing his or her account information, etc. At operation 430, the consumer financial institution 120 may receive the transmitted request to link and process the request. At operation 432, the consumer financial institution may transmit tokenized payment credentials corresponding the user's payment preferences, any additional user payment preferences, a billing link identifier or reference number (billing link ID), and the like (collectively referred to herein as "payment data") to the user computing device 126. The billing link ID may be an identifier specific to a bill payment platform associated with the financial account of the user 134 and can be used to identify the payment account of the user 134 at a subsequent date.

At operation 434, the user computing device 126 may be configured to store the payment data in the user's PDS. At operation 436, the user computing device 126 may be configured to transmit the PDS to the identity provider 110 (e.g., via the application 128), whereby, at operation 438, the identity provider 110 may associate the PDS to the digital identity of the user 134 and may encrypt the PDS using one or more encryption keys maintained by the identity provider 110. At operation 440, the identity provider 110 may return the encrypted PDS to the user computing device 126 for secure storage therein (e.g., in the memory 212). In this manner, the digital identity data of the user 134 is secured via multiple levels of security. For example, for someone (such as a fraudster) to access the digital identity data and/or the payment data of the user 134, the fraudster would need to gain access to the secure element of the user computing device 126 to retrieve the encrypted PDS. In addition, the fraudster would then need to gain access to the encryption keys used to encrypt the PDS, which are securely stored at the identity provider 110. The setup procedure for the user computing device 126 may be completed by the user 134, and the user computing device 126 may be configured to continue to normal operation.

Figure 5A:
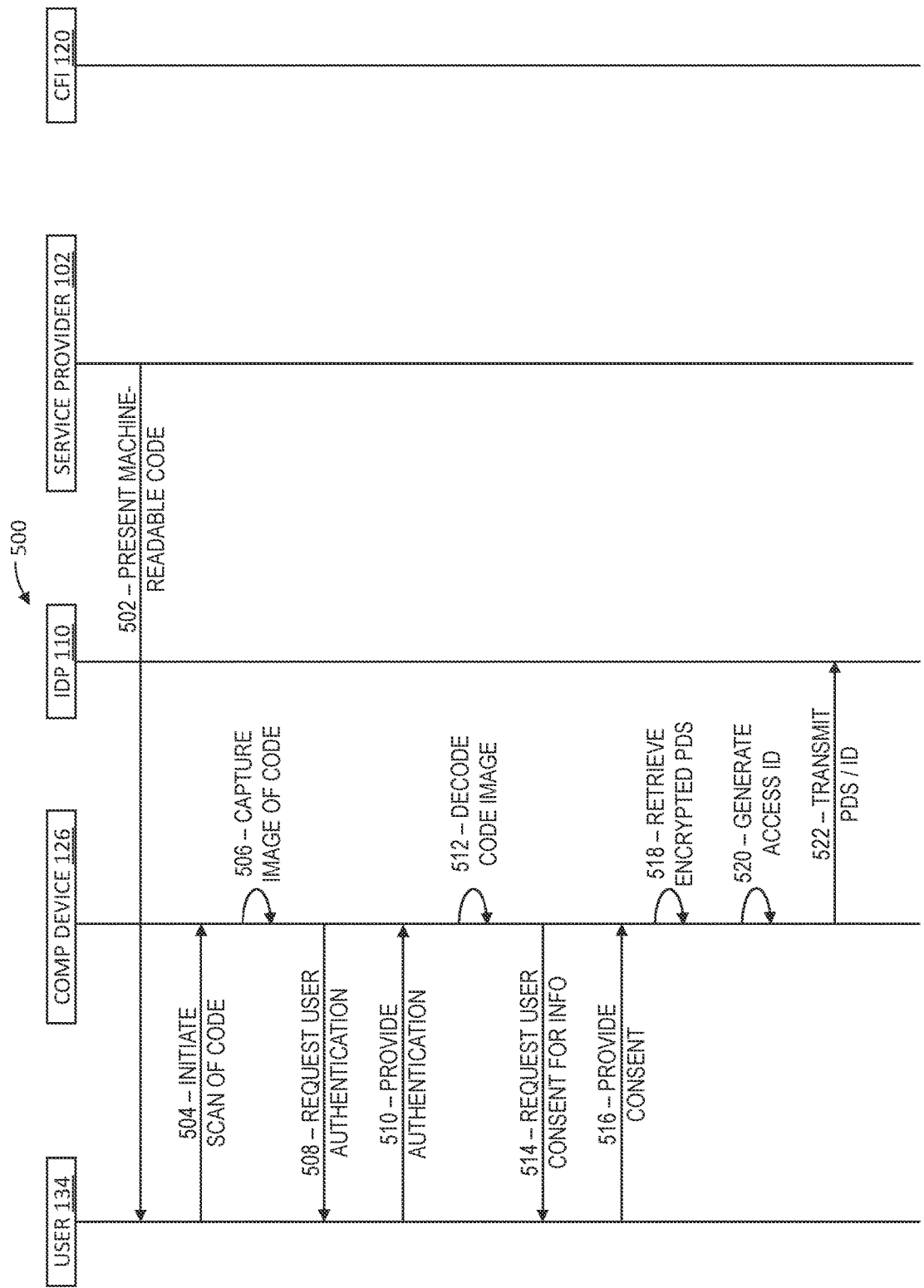
FIGS. 5A & 5B depict a flowchart illustrating an exemplary computer-implemented method for providing a service provider digital identity and billing information via a digital identity, according to one aspect of the present invention.
Figure 5B:
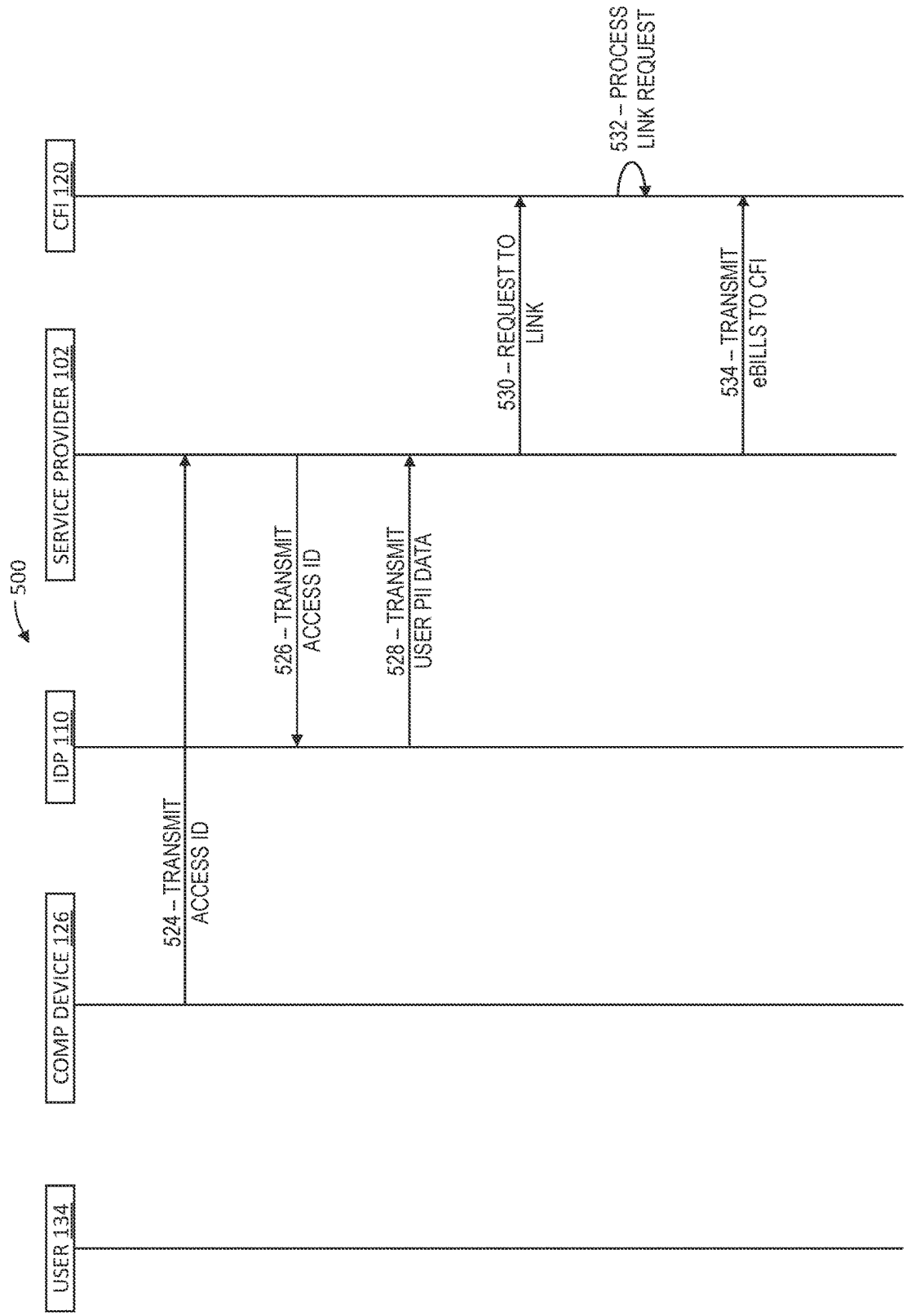

FIGS. 5A & 5B depict a flowchart illustrating an exemplary computer-implemented method 500 for providing a service provider digital identity and billing information via a digital identity, according to one aspect of the present invention. The operations described herein may be performed in the order shown in FIGS. 5A & 5B or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 500 is described below, for ease of reference, as being executed by exemplary devices and components introduced with the embodiments illustrated in FIGS. 1-3. In one embodiment, the computer-implemented method 500 is implemented by the user computing device 126 (shown in FIG. 1). While operations within the computer-implemented method 500 are described below regarding the user computing device 126, according to some aspects of the present invention, the computer-implemented method 500 may be implemented using any other computing devices and/or systems of the system 100 through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In the exemplary embodiment, the user 134 approaches the computing system 104 of the service provider 102 to check in, for example, for a service from the service provider 102. In an example, the service provider 102 may be a healthcare provider. At operation 502, the service provider 102 may provide a request to the user 134 to verify his or her identity. For example, in an embodiment, the computing system 104 of the service provider 102 may generate and display a machine-readable code (e.g., a bar code, quick response (QR) code, and the like). At operation 504, the user 134 may initiate a scan of the machine-readable code with the user computing device 126, using the application 138 running thereon. For example, at operation 506, when the machine-readable code is presented within the field of view of the user computing device 126, and more particularly, the photographic element 224, the user application 128 captures (via the photographic element 224) one or more images (i.e., image data) of the machine-readable code displayed thereon.

In one embodiment, the machine-readable code may be a QR code. A QR code includes a two-dimensional barcode or matrix barcode that is defined by the international standard ISO/IEC 18004:2015. A QR code includes three distinctive marks at the corners of the QR code image and one or more smaller marks proximate the fourth corner to normalize the image for size, orientation, and angle of viewing. In addition, dispersed within the four corners of the QR code are a plurality of small dots that can be converted to binary numbers and validated with an error-correcting algorithm. The binary number includes data that is encoded within the QR code. In one suitable embodiment, the data encoded in the QR code includes a request for user information, such as the user's identity (e.g., via a digital ID token) and/or other information, such as a mailing address (e.g., a street, a city, a state and ZIP code, etc.), a home phone number, a work phone number, a cell phone number, an email address, medical insurance information, and the like associated with the customer (e.g., the user 134). While the machine-readable code described herein is in reference to a QR code, the disclosure contemplates that any type of machine-readable code may be used that enables the system 100 to function as described herein. For example, the machine-readable code may include one or more of one-dimensional barcode formats, such as a UPC, code 39, EAN 8, or EAN 13, other two-dimensional formats such as PDF417 or Datamatrix, other n-dimensional barcode formats, and/or alphanumeric text or symbols or the like.

At operation 508, in response to scanning the machine-readable code, the user 134 may be prompted by the user computing device 126 (and in particular, the application 128 and/or SDK 130) to authenticate himself or herself. At operation 510, the user may provide the requested authentication. For example, the authentication may include entering a biometric or PIN into the user computing device 126. After the user 134 is authenticated, the application 128 may decode the machine-readable code, at operation 512, and may provide a request to the user 134 for the user information requested by the service provider 102, for example, via the machine-readable code, at operation 514. For example, the application may display a list of requested information on the display 220 of the user computing device 126. At operation 516, the user 134 may provide his or her consent to the requested information, for example, via user input to the application 128 by way of the user computing device 126. For example, in an embodiment, the user 134 may press a button or icon displayed on a user interface of the user computing device 126 to provide consent to share the request user information.

At operation 518, after receiving the user's consent, the application 128 may retrieve the encrypted PDS from memory, for example, via the SDK 130. At operation 520, the application 128 may generate a unique access ID. At operation 522, the application 128 may transmit the access ID, encrypted PDS, and a list of claims, to the identity provider 110. The list of claims may include, for example, a claim for each piece of user information (i.e., PII) requested by the service provider 102 and consented to by the user 134, such as a name, a mailing address (e.g., a street, a city, a state and ZIP code, etc.), a home phone number, a work phone number, a cell phone number, an email address, medical insurance information, payment information (e.g., the billing link ID), and the like. The access ID may be a one-time identifier that is associated with the service provider 102 and functions as an authorization grant. This access ID serves as proof that the user 134 has given consent (via the application 128) to the service provider to retrieve the PII data. At operation 524, the application 128 may provide the access ID to the service provider 102.

At operation 526, the service provider 102 may transmit the access ID to the identity provider 110. The access ID identifies the service provider 102 as an authorized entity to receive the requested PII associated with the user 134. That is, the PII associated with the list of claims received by the identity provider from the application 128 and associated with the access ID. In the example embodiment, the service provider 102 and the identity provider 110 may establish a secure communications channel to facilitate secure exchange of the PII associated with the user 134. For example, the service provider 102 may present the access ID to the identity provider 110, as discussed above, and may request an access token. The access token may be a short-lived credential that allows the service provider 102 to access the PII data of the user 134 on the computing system of the identity provider 110. The identity provider 110 may verify the access ID and, if valid, may issue the access token to the service provider 102. The service provider 102 may use the access token to request access to the PII data. The identity provider 110 may then verify the access token to ensure the service provider 102 has been authorized to access the requested PII data. If the access token is valid and the service provider 102 has been authorized, the identity provider 110 may transmit the requested PII data to the service provider 102, at operation 528. As described, the access token may have a limited lifespan to enhance security. After the access token expires, the service provider 102 may be required to obtain explicit consent again from the user 134, via the application 128, for example.

As described above, the requested PII data may include the billing link ID associated with the user 134 and his or her financial account data. At operation 530, the service provider 102 may transmit a request to link the service provider 102 to the financial account of the user 134, for example, using the billing link ID. The request may be transmitted to the consumer financial institution 120 or, in some embodiments, a third party billing service provider. At operation 532, the consumer financial institution 120 may receive and process the request to complete the service provider-user link. This link may validate the account information of the user to the service provider 102. The link also enables the service provider 102 to send messages to the user 134 via the consumer financial institution 120, such as new bills and/or bill payment reminders.

After the service provider 102 is authenticated with the user 134 via the service provider-user link, the user 134 may easily receive electronic bills (eBills) from the service provider 102, at operation 534, and make payments through a payment environment of the consumer financial institution 120 and/or via the application 128. The consumer financial institution 120 may store the tokenized payment credentials corresponding to the payment preferences of the user 134, such that the credentials may be automatically used for subsequent payments (e.g., one-time payments, scheduled payments, auto-payments, etc.), unless alternative payment credentials are requested to be used by user 134.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the invention.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

What is claimed is:

1. A system for use in managing a digital identity of a user, the system comprising:
   a user computing device associated with the user, the user computing device comprising a display, a photographic element, a first memory device, and a first processor in communication with the first memory device, the first processor configured to:
   provide to the user, an option to setup a digital identity on the user computing device;
   present, on the display, an instruction requesting that the user scan an image of a physical document associated with the user, wherein the physical document includes personal identifying information (PII) of the user;
   capture, by the photographic element, an image of the physical document;
   capture a biometric of the user;
   transmit the captured image of the physical document and the captured biometric to an identity provider computing device, thereby permitting the identity provider to verify the user based on the captured image of the physical document and the captured biometric;
   receive, from the identity provider computing device, a digital identity token that functions as evidence of the identity of the user;
   transmit, to a financial institution computing device, a request to link a financial account of the user to the digital identity token;
   receive, from the financial institution computing device, a billing link identifier; and
   store the digital identity token and the billing link identifier in a personal data store in the first memory device.

2. The system in accordance with claim 1, the first processor configured to:
   transmit the personal data store to the identity provider computing device, thereby permitting the identity provider computing device to encrypt the personal data store using one or more encryption keys maintained by the identity provider; and
   receive, from the identity provider computing device, the encrypted personal data store.

3. The system in accordance with claim 2, further comprising:
   a service provider computing device associated with a service provider, the service provider computing device comprising a second display device, a second memory device, and a second processor in communication with the second memory device,
   the second processor configured to present on the second display a machine-readable code, the machine-readable code including, encoded therein, a request for user information,
   the first processor configured to:
   capture image data of the machine-readable code with the photographic element;
   determine that the captured image data comprises an image of the machine-readable code;
   decode the machine-readable code;
   extract, from the decoded the machine-readable code, the request for user information; and
   receive, from the user via user input to the user computing device, user consent to the requested information.

4. The system in accordance with claim 3,
   the second processor configured to generate the machine-readable code including the request for user information.

5. The system in accordance with claim 3, wherein the machine-readable code includes one or more of the following: one-dimensional barcode, a two-dimensional barcode, a matrix barcode, a quick response code, and alphanumeric text or symbols.

6. The system in accordance with claim 3,
   the first processor configured to:
   based on the user consent, retrieve the encrypted personal data store from the first memory device;
   generate a unique access identifier;
   associate the unique access identifier with the service provider computing device;
   transmit the unique access identifier, the encrypted personal data store, and a list of claims to the identity provider computing device, the list of claims corresponding to the user information requested by the service provider; and
   transmit the unique access identifier to the service provider computing device,
   the second processor configured to:
   receive the unique access identifier from the user computing device;
   transmit the unique access identifier to the identity provider computing device; and
   in response to transmitting the unique access identifier, receive the requested user information from the identity provider computing device, the requested user information including the billing link identifier.

7. The system in accordance with claim 6,
   the second processor configured to:
   transmit, to the financial institution computing device, the billing link identifier and a request to link the service provider to the financial account of the user using the billing link identifier, thereby permitting the financial institution computing device to complete a service provider-user link, wherein the service provider-user link functions to validate the financial account of the user to the service provider.

8. The system in accordance with claim 1, wherein the digital identity token includes the captured image of the physical document, the captured biometric, and a device identifier for the user computing device.

9. The system in accordance with claim 1, wherein the biometric of the user includes one or more of the following:

a facial image of the user captured by the photographic element, a fingerprint of the user, an iris scan of the user, and a palm print of the user.

10. The system in accordance with claim 1,
wherein the physical document includes one or more of the following: attributes of the user and attributes of the identity of the user, and
wherein the physical document includes one or more of the following: a health insurance card, a passport, a government issued identification document, a government issued license, a social security card, a bank statement, an employee ID, a library card, and a utility bill.

11. A computer-implemented method for use in managing a digital identity of a user, the method comprising:
providing to the user, by a user computing device associated with the user, an option to setup a digital identity on the user computing device;
presenting, on a display of the user computing device, an instruction requesting that the user scan an image of a physical document associated with the user, wherein the physical document includes personal identifying information (PII) of the user;
capturing, by photographic element of the user computing device, an image of the physical document;
capturing a biometric of the user by the user computing device;
transmitting, by the user computing device, the captured image of the physical document and the captured biometric to an identity provider computing device, thereby permitting the identity provider to verify the user based on the captured image of the physical document and the captured biometric;
receiving, by the user computing device from the identity provider computing device, a digital identity token that functions as evidence of the identity of the user;
transmitting, to a financial institution computing device by the user computing device, a request to link a financial account of the user to the digital identity token;
receiving, by the user computing device from the financial institution computing device, a billing link identifier; and
storing, in a memory device of the user computing device, the digital identity token and the billing link identifier in a personal data store.

12. The computer-implemented method in accordance with claim 11, further comprising:
transmitting, by the user computing device, the personal data store to the identity provider computing device, thereby permitting the identity provider computing device to encrypt the personal data store using one or more encryption keys maintained by the identity provider; and
receiving, by the user computing device from the identity provider computing device, the encrypted personal data store.

13. The computer-implemented method in accordance with claim 12, further comprising:
presenting, by a service provider computing device associated with a service provider, a machine-readable code on a display of the service provider computing device, the machine-readable code including, encoded therein, a request for user information,
capturing, by the user computing device, image data of the machine-readable code with the photographic element;
determining, by the user computing device, that the captured image data comprises an image of the machine-readable code;
decoding, by the user computing device, the machine-readable code;
extracting, by the user computing device from the decoded the machine-readable code, the request for user information; and
receiving, from the user via user input to the user computing device, user consent to the requested information.

14. The computer-implemented method in accordance with claim 13, further comprising generating, by the service provider computing device, the machine-readable code including the request for user information.

15. The computer-implemented method in accordance with claim 13, wherein the machine-readable code includes one or more of the following: one-dimensional barcode, a two-dimensional barcode, a matrix barcode, a quick response code, and alphanumeric text or symbols.

16. The computer-implemented method in accordance with claim 13, further comprising:
based on the user consent, retrieving, by the user computing device, the encrypted personal data store from the memory device;
generating, by the user computing device, a unique access identifier;
associating, by the user computing device, the unique access identifier with the service provider computing device;
transmitting, by the user computing device, the unique access identifier, the encrypted personal data store, and a list of claims to the identity provider computing device, the list of claims corresponding to the user information requested by the service provider;
transmitting, by the user computing device, the unique access identifier to the service provider computing device,
receiving, by the service provider computing device, the unique access identifier from the user computing device;
transmitting, by the service provider computing device, the unique access identifier to the identity provider computing device; and
in response to transmitting the unique access identifier, receiving, by the service provider computing device from the identity provider computing device, the requested user information, the requested user information including the billing link identifier.

17. The computer-implemented method in accordance with claim 16, further comprising transmitting, by the service provider computing device to the financial institution computing device, the billing link identifier and a request to link the service provider to the financial account of the user using the billing link identifier, thereby permitting the financial institution computing device to complete a service provider-user link, wherein the service provider-user link functions to validate the financial account of the user to the service provider.

18. The computer-implemented method in accordance with claim 11, wherein the digital identity token includes the captured image of the physical document, the captured biometric, and a device identifier for the user computing device.

19. The computer-implemented method in accordance with claim 11, wherein the biometric of the user includes one or more of the following: a facial image of the user captured by the photographic element, a fingerprint of the user, an iris scan of the user, and a palm print of the user.

20. The computer-implemented method in accordance with claim 11,
wherein the physical document includes one or more of the following: attributes of the user and attributes of the identity of the user, and
wherein the physical document includes one or more of the following: a health insurance card, a passport, a government issued identification document, a government issued license, a social security card, a bank statement, an employee ID, a library card, and a utility bill.

\* \* \* \* \*